(12) United States Patent
Sobel et al.

(10) Patent No.: US 7,739,738 B1
(45) Date of Patent: Jun. 15, 2010

(54) ENABLING CLEAN FILE CACHE PERSISTENCE USING DUAL-BOOT DETECTION

(75) Inventors: William E. Sobel, Stevenson Ranch, CA (US); Bruce E. McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1127 days.

(21) Appl. No.: 11/376,770

(22) Filed: Mar. 15, 2006

(51) Int. Cl.
G06F 11/30 (2006.01)
G06F 12/14 (2006.01)
H04L 12/22 (2006.01)

(52) U.S. Cl. .............. 726/24; 726/22; 726/23; 726/25; 726/26; 726/30; 713/164; 713/165; 713/166; 713/167; 713/187; 713/188; 714/799

(58) Field of Classification Search .............. 726/24
See application file for complete search history.

(56) References Cited

U.S. PATENT DOCUMENTS

| | | | |
|---|---|---|---|
| 7,356,736 B2* | 4/2008 | Natvig | 714/38 |
| 7,536,598 B2* | 5/2009 | Largman et al. | 714/36 |
| 2003/0135791 A1* | 7/2003 | Natvig | 714/38 |
| 2004/0210796 A1* | 10/2004 | Largman et al. | 714/20 |
| 2004/0255000 A1* | 12/2004 | Simionescu et al. | 709/208 |

OTHER PUBLICATIONS

Borders, K., et al, 'Protecting Confidential Data on Personal Computers with Storage Capsules', 18th USENIX Security Symposium, 2009, pp. 367-382, http://www.usenix.org/event/sec09/tech/full_papers/sec09_malware.pdf.*

* cited by examiner

*Primary Examiner*—Edan Orgad
*Assistant Examiner*—Ronald Baum
(74) *Attorney, Agent, or Firm*—Fenwick & West LLP (57) ABSTRACT

A robust and reliable mechanism is disclosed for detecting whether a system has (or may have) been booted into a compromised or otherwise unprotected environment, so that a persisted clean file cache can be used across boots when appropriate. As such security scanning of files. A clean file cache can be maintained and used by a security application to avoid unnecessarily re-scanning a file that has not been modified since last being scanned and determined clean. Unnecessary scans are therefore avoided.

20 Claims, 5 Drawing Sheets

ENABLING CLEAN FILE CACHE PERSISTENCE USING DUAL-BOOT DETECTION

FIELD OF THE INVENTION

The invention relates to computer security, and more particularly, to a mechanism that allows a persisted clean file cache to be used across boots.

BACKGROUND OF THE INVENTION

Some antivirus products are configured with an auto-protect feature, which allows files to be scanned as they are accessed to prevent a virus from spreading and infecting. Some auto-protect features scan and repair compressed files without having to expand the file first. The auto-protect feature scans files sent from the Internet, removable disks, or e-mail attachments and looks for viruses, Trojan horse programs, and other malware. A clean file cache can be maintained and used by the auto-protect feature to avoid unnecessarily re-scanning a file that has not been modified since last being scanned and determined clean.

In typical operation, a target file is accessed for the first time during a user session. Prior to allowing that access to complete, the auto-protect feature automatically scans the file for malware. If malware is identified, the corresponding security application will take remedial action (e.g., cleaning, deleting, or quarantining the suspect code). Once the target file is determined to be clean (assuming it can be cleaned or was simply not infected), a corresponding entry is made in the clean file cache that identifies the file and its corresponding time stamp (or other modification indicator). If the target file is subsequently accessed, the auto-protect feature accesses the clean file cache to confirm whether the target file is present and remains unmodified since last determining its clean status. If so, then no scanning is performed. Otherwise, the target file can be re-scanned for various security risks such as those previously mentioned.

Currently, the clean file cache feature is not persisted to disk and used across boots. This is because there are no mechanisms to ensure that the file system has not been modified by, for example, dual-booting into an infected and/or unprotected operating system environment where files listed in the clean file cache may have become infected while proper security protection mechanisms were not present. As is known, dual-booting is enabled when multiple operating systems (two or more) are installed on a computer. At boot time, a boot loader program is activated thereby allowing the user to choose which operating system to boot. Dual-booting is found in many systems, such as those where the desired applications or other programmed functionality cannot all run on any one operating system (e.g., where some applications run on a Microsoft operating system and other applications run on a Linux operating system). Dual-booting also allows a user to migrate data prior to removing an old operating system.

What is needed, therefore, is a reliable mechanism for detecting whether a system has booted into an unprotected/compromised environment, so that a persisted clean file cache can be used across boots when appropriate.

SUMMARY OF THE INVENTION

One embodiment of the present invention provides a method for enabling clean file cache persistence in a system capable of security scanning. The method includes storing ID information for known clean files in a clean file cache, the known clean files resulting from security scanning. The method further includes recording, at each system boot-up and shutdown, dual-boot indicator information. In response to the dual-boot indicator information not indicating any dual-booting, the method includes persisting the clean file cache for use across a boot. The method may further include scanning files not identified in the clean file cache for undesired code, and performing remedial action when malicious code is detected by the scanning. In one particular case, the dual-boot indicator information includes MFT free sector bitmap data (e.g., check-sum or hash value of the MFT's free sector bitmap and/or a copy of the MFT's free sector bitmap). Here, the method includes comparing (at system boot-up) the previously recorded MFT free sector bitmap data with the current MFT free sector bitmap data. In response to the MFT free sector bitmap data not substantially matching (e.g., within a given threshold), the method includes invalidating the clean file cache. In another particular case, the dual-boot indicator information includes one or more NTFS transaction log entries. Here, the method includes identifying (at system boot-up) occurrence of NTFS transaction log entries after the time of the last shutdown and before the time of the current startup. In response to those particular NTFS transaction log entries being found, the method includes invalidating the clean file cache. Note that comparing the previously recorded MFT free sector bitmap data and identifying occurrence of NTFS transaction log entries may include accounting for timing differences between actual startup/shutdown times and recording times. In another particular case, the dual-boot indicator information includes input from a user. Here, the method includes prompting (at one or both of system boot-up and shutdown) the user for dual-boot information. In response to dual-boot activity being indicated by the user, the method includes invalidating the clean file cache. In another particular case, the dual-boot indicator information includes one or more of: MFT free sector bitmap data, one or more NTFS transaction log entries, user input regarding dual-boot activity, output from a multi-boot environment detector, and output from a boot sector routine configured to indicate dual-boot activity.

Another embodiment of the present invention provides a machine-readable medium (e.g., one or more compact disks, diskettes, servers, memory sticks, or hard drives) encoded with instructions, that when executed by one or more processors, cause the processor to carry out a process for enabling clean file cache persistence in a system capable of security scanning. This process can be, for example, similar to or a variation of the previously described method.

Another embodiment of the present invention provides a system for enabling clean file cache persistence in a system capable of security scanning. The system includes a clean file cache for storing ID information for known clean files, the known clean files resulting from security scanning. The system further includes a dual-boot detector module for recording, at each system boot-up and shutdown, dual-boot indicator information. In response to the dual-boot indicator information not indicating any dual-booting, the clean file cache is persisted for use across a boot. The system may further include a signature scanning module for scanning files not identified in the clean file cache for undesired code, and a security module for performing remedial action when malicious code is detected by the scanning. In one particular case, the dual-boot indicator information includes MFT free sector bitmap data, and the dual-boot detector module is further configured for comparing (at system boot-up) the previously recorded MFT free sector bitmap data with the current MFT free sector bitmap data. In response to the MFT free sector bitmap data not substantially matching (e.g., within a given threshold), the dual-boot detector module is further configured for invalidating the clean file cache. In another particular case, the dual-boot indicator information includes one or more NTFS transaction log entries, and the dual-boot detector module is further configured for identifying (at system boot-up) occurrence of NTFS transaction log entries after the time of the last shutdown and before the time of the current startup. In response to those particular NTFS transaction log entries being found, the dual-boot detector module is further configured for invalidating the clean file cache. Note that comparing the previously recorded MFT free sector bitmap data and identifying occurrence of NTFS transaction log entries may include accounting for timing differences between actual startup/shutdown times and recording times. In another particular case, the dual-boot indicator information includes input from a user, and the dual-boot detector module is further configured for prompting (at one or both of system boot-up and shutdown) the user for dual-boot information. In response to dual-boot activity being indicated by the user, the dual-boot detector module is further configured for invalidating the clean file cache. In another particular case, the dual-boot indicator information includes one or more of: MFT free sector bitmap data, one or more NTFS transaction log entries, user input regarding dual-boot activity, output from a multi-boot environment detector, and output from a boot sector routine configured to indicate dual-boot activity. The system functionality can be implemented, for example, in software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. Many suitable means for implementing embodiments of the present invention will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

Note that the figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

DETAILED DESCRIPTION OF THE INVENTION

A robust and reliable mechanism is disclosed for detecting whether a system has (or may have) been booted into a compromised or otherwise unprotected environment, so that a persisted clean file cache can be used across boots when appropriate.

General Overview

As previously explained, a clean file cache can be maintained and used by a security application's auto-protect feature to avoid unnecessarily re-scanning a file that has not been modified since last being scanned and determined clean. In accordance with one embodiment of the present invention, upon startup of a user session (e.g., commencing from boot-up), the persisted clean file cache from a previous protected session is used if it is determined that the system was not booted into an unprotected environment in the interim between the current user session and the last user session booted into a known protected environment. If an interim boot into an unprotected environment is detected, then the persisted clean file cache is purged or otherwise invalidated and then repopulated during the current session (and any future sessions that occur without interim boots in unprotected environments).

Most users will not use a system configured with dual-boot capability, and those users that utilize dual-boot capability do so rarely. This means that for a majority of user sessions, a persisted clean file cache could be used to avoid unnecessary scans. Also, the percentage of files that have been accessed and scanned increases over time, thereby adding to the clean file cache and further reducing the chances of accessing a file that needs to be scanned. Such a persisted clean file cache greatly reduces the performance impact of the auto-protect feature. Scheduled full system scanning performance is also greatly improved.

The persisted clean file cache can also be used to speed up on-demand scanning, for both file and full system scanning. For instance, the on-demand scanner can place all of the files it finds clean into the clean file cache, thereby preventing the real-time (auto-protect) component from re-scanning those files. Likewise, any files that are identified in the clean file cache can be skipped by the on-demand scanner when it enumerates the file system.

As disk sizes continue to increase, so does the number of stored files that need to be scanned. Various embodiments of the present invention can beneficially be used to effectively reduce scan times to acceptable durations, without compromising security of the user computing system.

System Architecture

Figure 1:
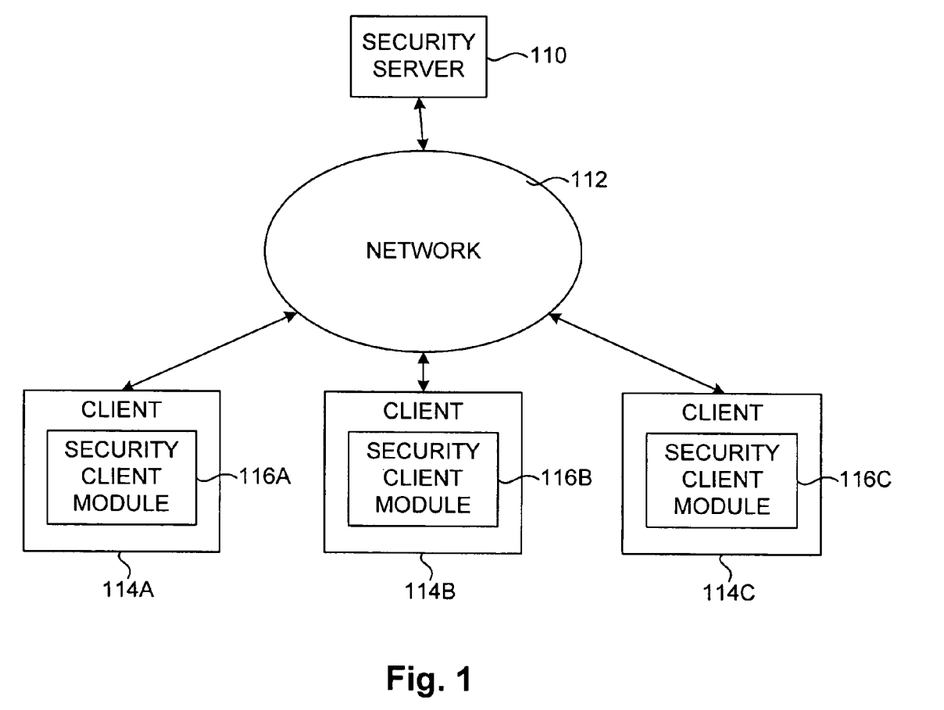
FIG. 1 is a block diagram of a computing environment configured in accordance with an embodiment of the present invention.

FIG. 1 is a block diagram of a computing environment configured in accordance with an embodiment of the present invention. As can be seen, the computing environment includes a security server 110 connected to a network 112. The network 112 is also connected to multiple client computers 114, each of which includes a security client module 116.

The network 112 may be any type of communications network, such as a local area network (e.g., intranet), wide area network (e.g., Internet), or some combination thereof. Alternatively, the network 112 may be a direct connection between a client computer 114 and the security server 110. In general, the client computers 114, network 112, and/or the security server 110 may be in communication via any type of wired or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security server 110 may indirectly communicate with the client computer 114 via U.S. mail or other such delivery service, where a processor readable medium (e.g., compact disk or floppy disk) is sent to the address where one of the clients 114 is located. This processor readable medium can be encoded with instructions and/or data files that can be loaded, executed and/or otherwise used by the client 114.

The security server 110 is provided by a security software vender or other entity. The security server 110 can include one or more standard computer systems configured to communicate with client computers 114 via the network 112. For example, the security server 110 can include a web server, FTP server, or other technology that enables the security server 110 to interact with the client computers 114 via the network 112. In one embodiment, the security server 110 provides signatures and code to the client computers 114, for detecting and eradicating malicious code via security scanning (whether access or on-demand based) technology. In addition, the security server 110 can provide signatures of exclusions, which are programs, routines, applications, etc that are known to legitimate.

The client computer 114 is an electronic device that can host various forms of malicious software. In one embodiment, the client computer 114 is a conventional computer system executing, for example, a Microsoft Windows-compatible operating system (OS), Apple OS X, and/or a Linux distribution. In another embodiment, the client computer 114 is another device having computer functionality, such as a personal digital assistant (PDA), cellular telephone, video game system, etc. Such client computers 114 typically store numerous computer files that can host malicious software, and may or may not have dual-boot capability (two or more bootable operating systems) as previously explained. Although only three client computers 114 are shown, note that some embodiments of the present invention have only one, while other embodiment may have thousands or millions of such clients.

Malicious software, sometimes called "malware," is generally defined as software that executes on the client computer 114 surreptitiously or that has some surreptitious functionality. Malicious software can take many forms, such as parasitic viruses that attach to legitimate files, worms that exploit weaknesses in the computer's security to infect the computer and spread to other computers, Trojan horse programs that appear legitimate but actually contain hidden malicious code, and spyware that monitors keystrokes and/or other actions on the computer in order to capture sensitive information or display advertisements. The executable file that hosts the malicious software can be modified with one or more packers in order to make the malicious software difficult to detect.

The client computer 114 executes a security client module 116 for detecting the presence of malicious software. The security module 116 can be, for example, incorporated into the OS of the computer or part of a separate comprehensive security application package. In one embodiment, the security client module 116 is provided by the entity that operates the security server 110. The security client module 116 can communicate with the security server 110 via the network 112 in order to download the exclusions, signatures and/or other information utilized to detect malicious software. In an embodiment described here, the security client module 116 can detect malicious software by scanning files stored on memory of the client computer 114, using conventional or custom scanning techniques.

Figure 2:
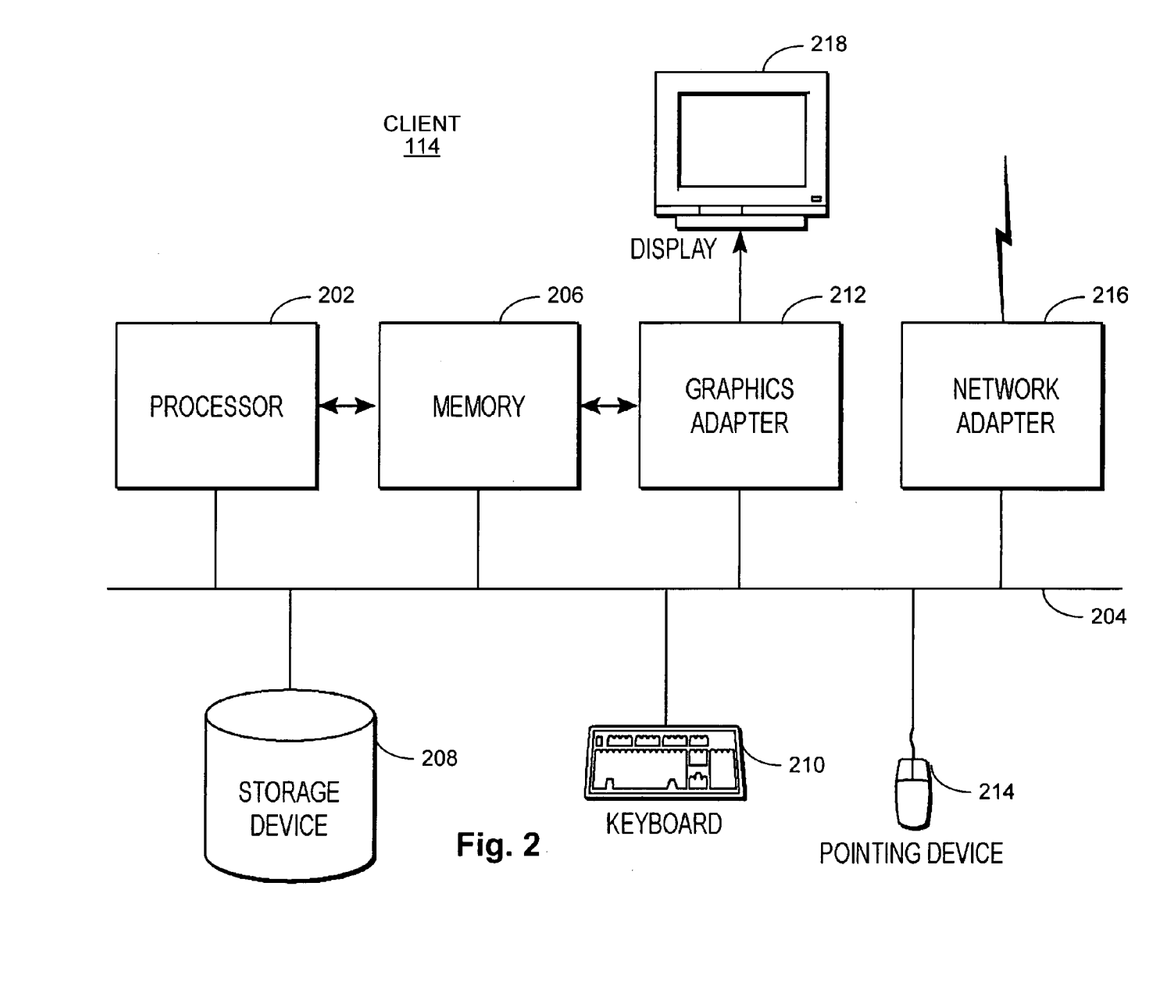
FIG. 2 is a block diagram illustrating a functional view of a client computer configured in accordance with an embodiment of the present invention.

FIG. 2 is a block diagram illustrating a functional view of a client computer 114 configured in accordance with an embodiment of the present invention. As can be seen, the client computer 114 includes a processor 202 operatively coupled via' a bus 204 to a memory 206, a storage device 208, a keyboard 210, a graphics adapter 212, a pointing device 214, and a network adapter 216. A display 218 is operatively coupled to the graphics adapter 212.

The processor 202 may be any CPU, microcontroller, or other processor, such as those produced by AMD, Analog Devices, HP, IBM, Intel, Siemens, Zilog, and NEC to name a few. In general, processor 202 can be any processor that can execute desired software programs, such as one or more operating systems (e.g., Windows and/or Linux) and one or more applications (e.g., word processor, spreadsheet, graphics, browser, email, and security applications) for the client 114.

The memory 206 may be, for example, firmware ROM, RAM, and/or flash memory, and holds instructions and data used by the processor 202. The pointing device 214 may be a mouse, track ball, or other type of pointing device, and is used in combination with the keyboard 210 by the user to interact with the computer 114, as is typically done. The graphics adapter 212 displays images and other information on the display 218. The network adapter 216 communicatively couples the computer 114 with the network 112 (by wired or wireless technology).

The storage device 208 is a hard disk drive in one embodiment, but can also be any other device capable of storing data, such as a writeable compact disk or DVD, and/or a solid-state memory device. The storage device 208 can hold multiple files containing executable code and/or data files, as is typically done. The computer 114 can load an executable file (e.g., DLLs and applications) into memory 206 and execute it using the processor 202. Data files can also be displayed via display 218 for user viewing, such as digital image files (pictures, videos, etc), emails, presentations, and text documents. In short, any number of storage devices 208 can be integrated into, or otherwise accessible by, client 114, with any such storage device capable of storing files that can be scanned for security purposes.

The files stored on the storage device 208 can be, for example, in the Microsoft Windows Portable Executable (PE) format. Typically, a PE file is of type .EXE, indicating that the file is an executable file, or .DLL, indicating that the file is a dynamic link library (DLL) that can be executed by other files. The PE file header holds a data structure containing fields that provide basic information about the file. One such field is BaseOfImage, which describes the preferred base address in the address space of the process to which the operating system should map the executable file image. Another field is SizeOfImage, which indicates the amount of memory in the process's address space to reserve for the loaded executable image. Other file formats, such as those utilized by Apple Macintosh and Linux-based computers usually contain similar information.

The computer 114 is adapted to execute computer program modules for providing protective functionality described herein, including security scanning with clean file cache persistence enabled through dual-boot detection. In this particular example, the term "module" refers to computer program logic for providing the specified functionality. Note, however, that other modules configured in accordance with the principles of the present invention can be implemented in hardware, firmware, software, or some combination thereof. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on the storage device 208 as executable files, loaded into the memory 206, and executed by the processor 202 as one or more processes.

Security Module

Figure 3:
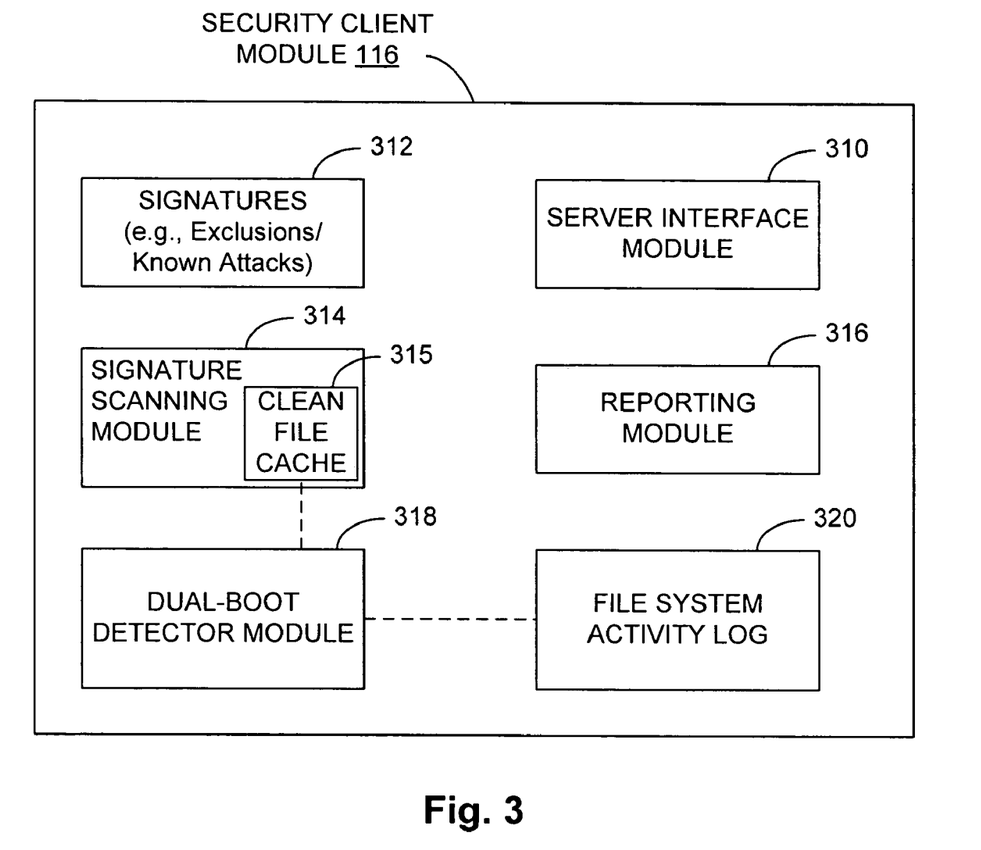
FIG. 3 is a block diagram illustrating modules within a security client module configured in accordance with an embodiment of the present invention.

FIG. 3 is a block diagram illustrating modules within the security client module 116 according to one embodiment of the present invention. As can be seen, the module 116 includes server interface module 310, signature database 312, a signature scanning module 314, a clean file cache 315, a reporting module 316, a dual-boot detector module 318, and a file system activity log 320. As previously explained, each of these components can be implemented in software (e.g., C, C++, Java, or other suitable programming language) that executes on a processor of a client computer. However, other embodiments could be implemented, for example, in hardware (such as in gate level logic or ASIC), or firmware (e.g., microcontroller configured with I/O capability for receiving data from external sources and a number of routines for enabling clean file cache persistence via dual-boot detection as described herein), or some combination thereof. In addition, note that the modules are shown as separate for purposes of illustration, and that other embodiments may have the various functionalities or sub-sets thereof integrated into a single module. Numerous configurations will be apparent in light of this disclosure.

The server interface module 310 enables communication between the security client module 116 and the security server 110 via the network 112. It may also be programmed or otherwise configured to send and receive information from processes on the local machine 114, or from other devices on the network 112. In one embodiment, the server interface module 310 retrieves signatures of known malicious software and exclusions from the server 110, and provides suspect code and host files to the server 110. Once module 310 receives the signatures and exclusions from server 110, it updates the signature database 312 accordingly.

The signatures database 312 stores signatures of known exclusions. As previously explained, exclusions are trusted programs, routines, applications, etc that are known to be legitimate. Thus, if suspect code is detected, then the security client module 116 can be configured to determine if that code is legitimate or otherwise "friendly" code. If not, then the appropriate remedial action can be taken (e.g., alerting user of infected file and/or cleaning/quarantining/deleting file). The signatures database 312 can also be configured to store signatures for identifying known malicious software on the client computer 114. In one embodiment, the signatures in the signatures database 312 contain strings, instruction usage records and/or other data that can be used to uniquely identify specific types of malicious software (or trusted software, for purposes of exclusion from security processing). For example, a signature can contain a specific sequence of values that are found in only a particular virus. If a file on the storage device 208 of the client computer 114 has the sequence of values, then that file is infected with the virus. The signatures are designed to be utilized with executable files, such as those in the WINDOWS PE format, and with other types and formats of files that might contain malicious software.

The signature scanning module 314 scans programs and files stored on storage device 208 or in memory 206 (or in other stores) for the presence of the signatures in the signatures database 312. In one embodiment, the signature scanning module 314 analyzes a file to identify its potential entry points and other locations likely to contain malicious software. The module 314 scans these likely locations to determine whether they contain a signature from the signatures database 312. In one embodiment, the signature scanning module 314 performs additional analysis of the file, such as emulating instructions of the file within a virtual machine and then scanning the memory of the virtual machine for matching signatures. The scanning can be performed, for example, access or on-demand basis, and/or as part of a scheduled overall security check. As previously discussed, the scanning may be implemented with an auto-protect feature, but need not be. Numerous scanning techniques and schemes can be implemented by module 314.

Scanned files that are determined to be clean are identified in the clean file cache 315. Such clean files may have been scanned with no indication of malicious code, prior to making an entry into the clean file cache 315. Other such clean files may have been compromised in some way (e.g., based on detection by the scanning module), and then subjected to remedial processing to render the file clean. The ID of each clean file noted in the cache 315 can be, for example, the file name and/or some other unique ID. In one particular embodiment, the ID includes the full volume name/identifier and full path of the file, a hash thereof, and/or the unique volume serial number/ID (e.g., provided by NTFS) and a file ID (e.g., also provided by NTFS). The GetVolumeInformation function returns information such as the volume name and serial number that can be used to create a unique volume name. One clean file cache can be used per volume, so names would only need to be unique to a volume. As is known, NTFS systems include APIs that return a unique "file id." On FAT systems there are also "file ids" that are based on the starting cluster number of the file and the cluster of the containing directory entry. On Unix based systems, the Mode can serve as a unique ID for a file. As previously discussed, the full path file name can also be used (and/or a combination of the file id and its full path).

The cache 315 can be implemented with any type of non-volatile storage facility such as EPROM, flash, available memory in processor 202, memory 206, storage 208, or any other memory that persists through power down and reboots. In one particular embodiment, the cache 315 alphabetically lists clean file IDs to facilitate quick look-up during the scanning process performed by module 314. If a file is listed in the clean file cache 315, then the scanning module 314 will not scan that file, thereby reducing scan times as well as the performance impact of scanning.

The reporting module 316 can be used to provide a user interface that informs the user of infections, intrusions, and security actions taken (or recommended). Note, however, that no reporting is necessary, in that malicious program requests and other activity could be silently denied or otherwise resolved. In addition, module 316 can also be configured to collect information about newly detected threats and submit them to an analysis agent, such as a remote security response center (e.g., via the server interface module 310 and network 112). The collected information could include, for example, the functional profile of the threat (e.g., what it did to the client computer and how) and/or samples of suspect code.

The dual-boot detector module 318 is programmed or otherwise configured to a method for enabling clean file cache persistence using dual-boot detection, as described herein. In one particular application, and to offer maximum protection, the modules of security client module 116 (including any antivirus driver modules or other security driver modules) are loaded as early as possible in the boot process and unload as late as possible in the shutdown process. The dual-boot detector module 318 allows for detection of dual-boot indications by managing a file system activity log 320 at each startup and shutdown.

In one particular embodiment, and for both startup and shutdown, the dual-boot detector module 318 records the following in the file system activity log 320: the current time, a check-sum of the MFT's free sector bitmap, and the sequence number, timestamp, and check-sum of the last entry in the NTFS transaction log. In an alternative embodiment, an entire copy of the MFT's free sector bitmap and copies of the last few entries in the NTFS transaction log are logged. In one such case, the number of entries in the NTFS transaction log (of which copies can be kept in the file system activity log 320 or otherwise made accessible to the system) is configurable by the user (e.g., by operation of a pull-down menu or other suitable user interface mechanism). As is known, the MFT (master file table) effectively acts as the master "map" of the file system's layout (where files are located), and essentially includes metadata about every file and directory on the NTFS file system. The MFT includes parameters such as location, size, and access permissions.

There may be a few NTFS transaction log entries that occur just before those logged into the file system activity log 320 by the dual-boot detector module 318 upon startup and just after those logged into the file system activity log 320 by the dual-boot detector module 318 upon shutdown, but those NTFS transaction log entries should lie within a very narrow band of time before startup or after shutdown of the dual-boot detector module 318 as recorded in file system activity log 320 event times. Upon startup, the dual-boot detector module 318 compares the state (e.g., checksum or value resulting from hash function) of the logged MFT's free sector bitmap (as indicated in file system activity log 320) with the current state. If the states are the same, then it can be assumed that there was no interim boot into another operating system. However, if the states are different, then the file system has been modified between the last shutdown and the current startup by some other potentially unprotected operating system.

Alternatively, or in addition, the dual-boot detector module 318 may be configured to detect if there are NTFS transaction log entries that are clearly after the narrow band of time just after the last shutdown of the dual-boot detector module 318 (as indicated by entries the in file system activity log 320) and before the narrow band of time just before the current startup of the dual-boot detector module 318 (as indicated by entries in the file system activity log 320). In other words, the startup and shutdown of the boot detector module 318 (as recorded by entries in the file system activity log 320) closely approximate the startup and shutdown times of the operating system sessions monitored by the dual-boot detection module 318. Thus, if there are such NTFS transaction log entries, then it can be assumed that a modification to the file system occurred in an unprotected session. Note that, for an NTFS file system to be considered consistent, the NTFS transaction log must be updated if the file system has been modified by any means, including by drivers in other operating systems. If the dual-boot detector module 318 detects that a dual-boot has likely taken place, the persisted clean file cache 315 is invalidated (e.g., clear memory function or purge/delete entries or reset memory pointing scheme).

Other dual-boot indicators can also be used, as will be apparent in light of this disclosure. In one particular embodiment, the dual-boot detector module 318 is configured to prompt the user upon shutdown as to whether or not they intend to dual-boot. Similarly, the dual-boot detector module 318 can be configured to prompt the user upon startup as to whether or not they have dual-booted. An indication from such user prompts that a dual-boot was intended or actually occurred results in the dual-boot detector module 318 invalidating the clean file cache 315. In another particular embodiment, a component is included (e.g., in the dual-boot detector module 318) that detects multi-boot environments. Such a component can detect a multi-boot environment, for example by analyzing the boot.ini file, or by boot sector analysis, etc. Such a multi-boot environment detector component can be used to note an increased possibility of dual-booting. Other dual-boot possibilities include booting from a CD or other media, or having the hard drive re-mounted somewhere. Such a multi-boot environment detector component can also be used for installing a component within detected alternate boot environments that will specifically log (e.g., using file system activity log 320) a boot into that environment. Alternatively, or in addition, the boot sector itself can be modified to run code that will make an indication (e.g., make entry into file system activity log 320) that can be used to detect a dual-boot occurrence.

Any one or more of such dual-boot indicators can be employed in accordance with an embodiment of the present invention. By using multiple indicators to detect dual-boot, the difficulty in defeating the security mechanisms described herein is increased. In any case, scanning performance is vastly improved for the majority of use cases, without compromising robustness of security scheme.

A trusted computing environment can be used to protect the integrity of the file system activity log 320, by using secure storage facilities of that environment. For example, nearly all personal computers (e.g., desktop, laptop, etc) will soon contain hardware for secure storage, such as that which can be used for trusted core features of the Microsoft Windows Vista operating system. Such secure storage for file system activity log 320 could be implemented, for example, using memory 206 or storage 208. Likewise, processor 202 may include secure storage for storing file system activity log 320. Likewise, companies such as Intel provide network cards (e.g., network adapter 216) having secure storage that can be reserved or otherwise used to securely store file system activity log 320.

The dual-boot detector module 318 may also be configured to log the fact that a likely dual-boot has been detected and, for a configurable length of time afterwards, not use the persisted clean file cache 315 upon startup. This is done in anticipation that dual-boot events typically occur in clusters. Users can control this feature by specifying (e.g., edit box or other suitable mechanism, where the entry can be zero or greater) the length of time appropriate to their particular use.

If the security client module 116 runs in all sessions that are dual-booted into, then all sessions can update the same file system activity log 320. In such a case, note that despite dual-booting activity, the clean file cache could still be persisted due to each environment being protected by the security client module 116. Likewise, there may be a security client module 116 installed for each environment. In such a case, one of the dual-boot detector modules 318 can be assigned a primary status, while other detector modules 318 can be assigned slave status (e.g., with such assignments being user configurable or automatic based on a discovery scheme). Here, the file system activity log 320 of the primary detector module 318 could be updated with entries from the other file system activity logs 320 when booting into the operating system of that "primary" file system activity log 320. Any number of distributed data and replication techniques can be used to ensure consistency of the various file system activity logs 320.

There may be other times that the clean file cache 315 should be invalidated. For example, the clean file cache 315 should be invalidated when new virus definitions become available. Techniques for optimizing/minimizing clean file cache 315 invalidations based, for example, on the age of the definitions and the age of the file modifications can also be used, as desired.

Note that the file system activity log 320 can optionally be integrated into the dual-boot detector module 318, if so desired. Likewise, the file system activity log 320 and/or the dual-boot detector module 318 can optionally be integrated into signature scanning module 314. In general, the modules are shown in FIG. 3 as being distinct from one another for the purpose of illustration. Other configurations and variations will be apparent in light of this disclosure.

Methodology

Figure 4A:
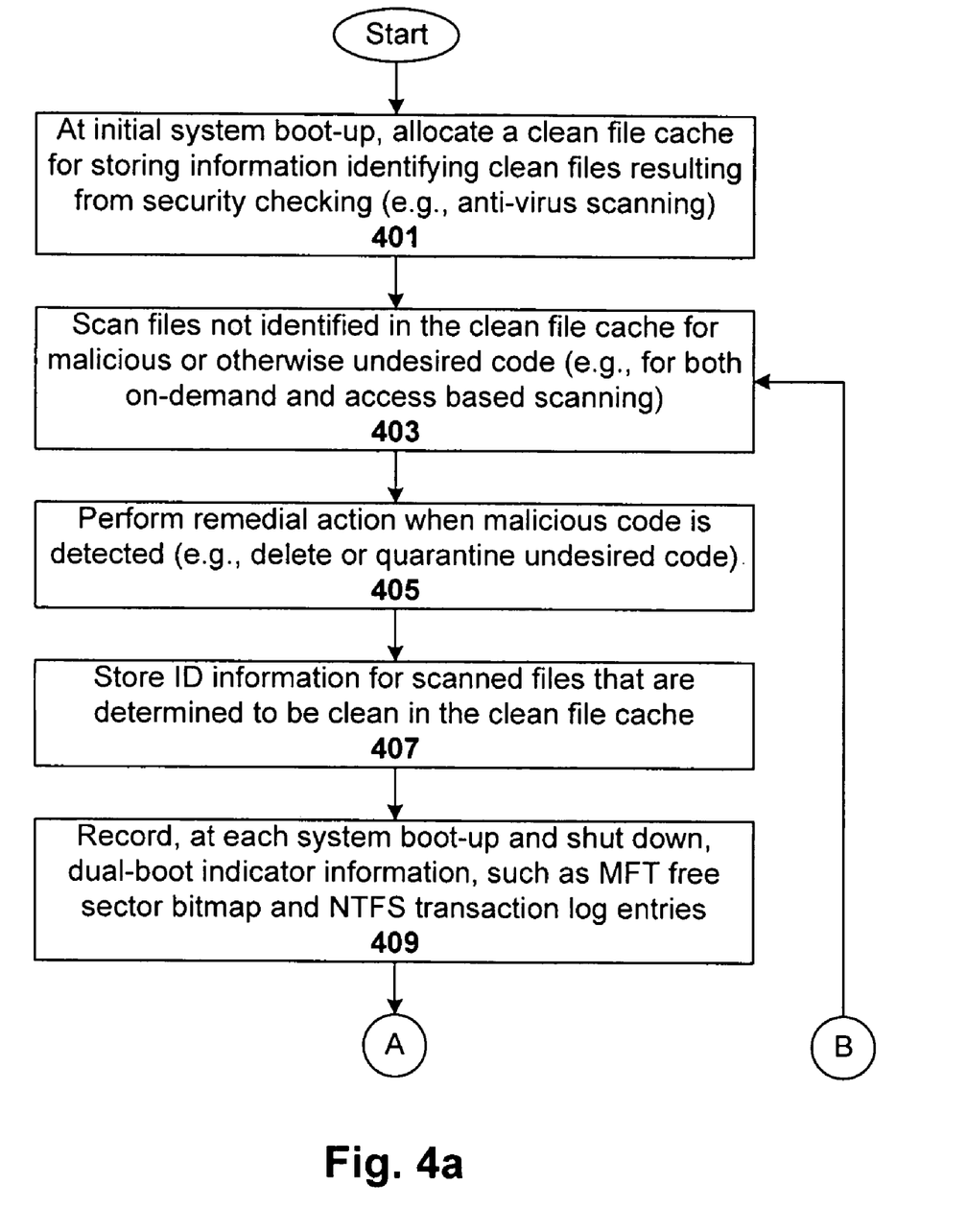
FIGS. 4*a* and 4*b* illustrate a method for enabling clean file cache persistence using dual-boot detection in accordance with an embodiment of the present invention.
Figure 4B:
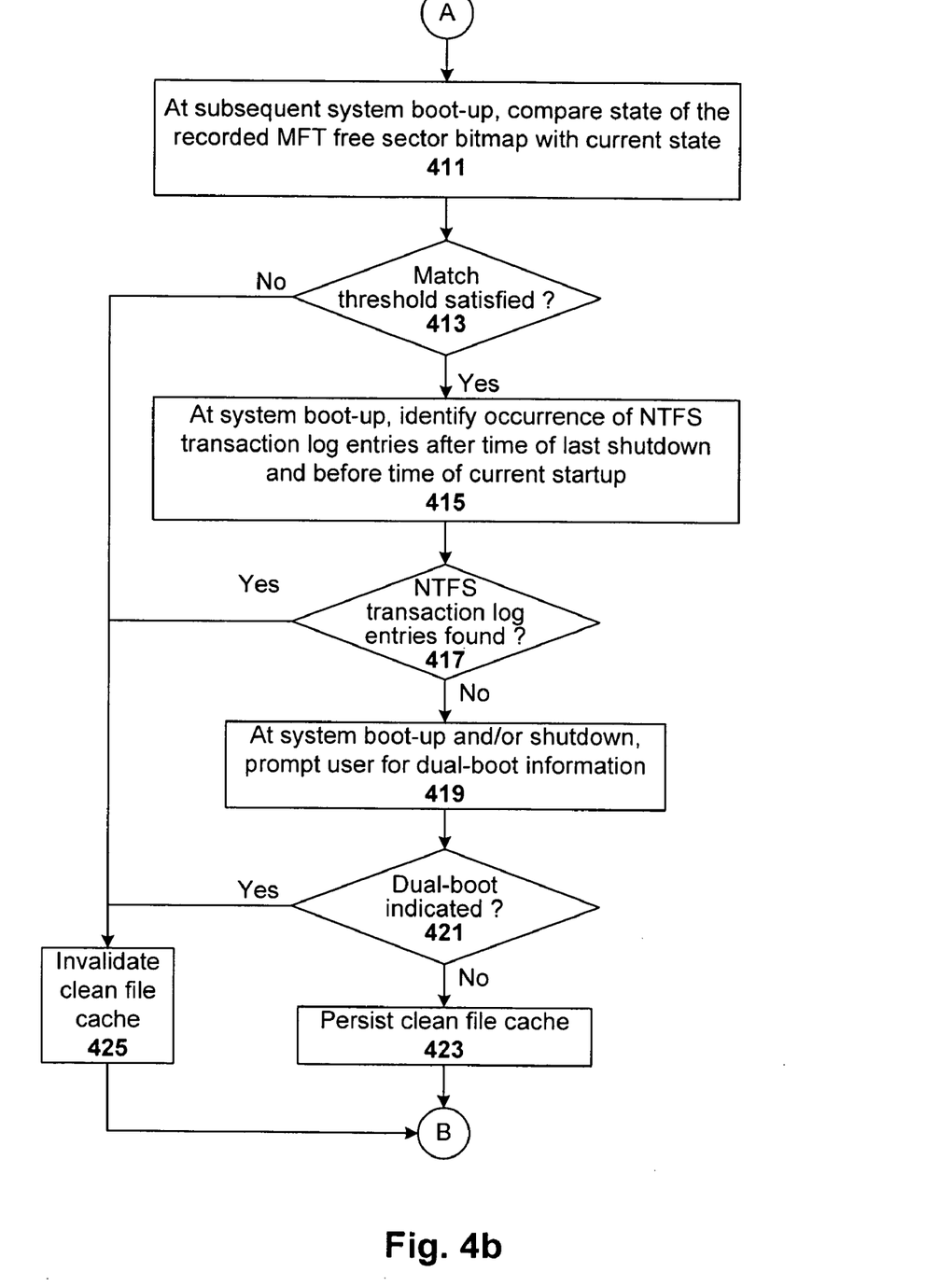

FIGS. 4a and 4b illustrate a method for enabling clean file cache persistence using dual-boot detection in accordance with an embodiment of the present invention. This method can be carried out, for example, by the signature scanning module 314, clean file cache 315, dual-boot detector module 318, and the file system activity log 320 as described with reference to FIG. 3. As previously explained, these modules can be implemented as executable code encoded on a machine-readable medium, in accordance with one particular embodiment.

At initial system boot-up, the method includes allocating 401 or otherwise providing a clean file cache for storing information identifying clean files resulting from security checking (e.g., anti-virus scanning). As previously explained, this cache can be implemented locally within the host client, with any number of storage devices or techniques.

The method includes scanning 403 files not identified in the clean file cache for malicious or otherwise undesired code (e.g., for both on-demand and access based scanning). The cache initially will be empty (prior to its first use or after being invalidated for whatever reason), so more scanning will be performed initially. However, as the scanning of files continues over the current user session, as well as subsequent user sessions (assuming the cache is not invalidated), more files will be identified in the clean file cache thereby resulting in fewer accessed files in need of scanning.

The method includes performing 405 remedial action when malicious code is detected (e.g., clean, delete, or quarantine undesired code). Any number of conventional or custom remedial processing schemes can be employed. The method further includes storing 407 ID information for scanned files that are determined to be clean in the clean file cache. As previously explained, these clean files may have been scanned with no indication of malicious code, or cleaned by operation of some remedial processing. In one particular embodiment, the cache alphabetically lists clean file IDs to facilitate quick look-up during the scanning 403 process. Other storage/ID mechanisms and schemes can be used as well, such as look-up tables, searchable files, databases (e.g., query/search/response protocol), and programmable logic (e.g., each file has an N-bit code associated with it, so as to provide $2^N$ unique file IDs that can be stored or otherwise indicated in the clean file cache).

The method includes recording 409, at each system boot-up and shutdown, dual-boot indicator information. As previously explained, any number (e.g., one or more) of dual-boot indicators can be used to detect dual-boot. In the embodiment shown in FIG. 4a, this dual-boot indicator information includes MFT free sector bitmap state data (e.g., checksum, hash value, etc) and one or more NTFS transaction log entries. At subsequent system boot-up, the method includes comparing 411 state of the previously recorded MFT free sector bitmap with current state of the MFT free sector bitmap. The method continues with determining 413 if the MFT free sector bitmap states substantially match. If not, then the method proceeds with invalidating 425 the clean file cache (effectively resetting the cache). Whether the MFT free sector bitmap states substantially match can be determined, for example, based on the count of bitmap bits that do not match. In one particular embodiment, if a threshold of more than 10 entries are different, then it is determined that the bitmaps do not match (thereby resulting in the cache being invalidated). On an NTFS volume which typically averages a 4 Kbyte cluster size, this example threshold indicates that 40 Kbytes of differences can exist before the cache is invalidated. The matching threshold can be, for instance, a tunable (e.g., based on empirical data) or user selectable parameter. Alternatively, the matching threshold can be fixed. Thus, it will be appreciated in light of this disclosure that an exact match of bitmap data is not required to persist the clean file cache.

If, however, the MFT free sector bitmap states do substantially match, then method continues with, at system boot-up, identifying 415 occurrence of NTFS transaction log entries after time of last shutdown and before time of current startup. The method continues with determining 417 if such NTFS transaction log entries indicating activities outside the monitored sessions have been found. If so, then the method proceeds with invalidating 425 the clean file cache (effectively resetting the cache).

As previously discussed, when the actual and logged versions of the volume bitmap and/or transaction logs are compared or otherwise analyzed for dual-boot activity, a small window of changes can be allowed (e.g., due to timing issues as to when the dual-boot detector module can look at the file system at startup and shutdown). For example, and in accordance with one particular embodiment, if the last activity at shutdown is recorded at 5:03:01, a window of a few seconds is provided just after that recorded time (e.g., 5:03:04) where it is assumed any activity in that window is from the same protected session even though the dual-boot detector module has not seen the changes (e.g., because it too was being shutdown). In one such case, the recorded timing information includes this buffering window, where the time of the last recorded activity is automatically adjusted by adding 1 to 5 seconds. Likewise, the time of the first recorded activity can be adjusted by subtracting 1 to 5 seconds. These buffering windows effectively mitigate any timing issues that may arise due to timing differences between start-up and shutdown times of the dual-boot detector module and the protected host system.

If NTFS transaction log entries indicating activities outside the monitored sessions are not found, then the method may also include, at system boot-up and/or shutdown, prompting 419 the user for dual-boot information (e.g., "do you intend to dual-boot?" at shutdown, and/or "did you dual-boot?" at boot-up). The method continues with determining 421 if dual-boot activity is indicated by the user. If so, then the method proceeds with invalidating 425 the clean file cache (effectively resetting the cache). Otherwise, the method continues with persisting 423 the clean file cache.

Note that even though the example embodiment shown in FIGS. 4a-b analyzes multiple dual-boot indicators, other embodiments of the present invention can use just one dual-boot indicator, or as many dual-boot indicators as desired. Other dual-boot indicators will be apparent in light of this disclosure (e.g., multi-boot environment detector component for indicating an increased possibility of dual-booting and installing a component within detected alternate boot environments that will specifically log or otherwise record a boot into that environment, and/or modifying the boot sector to run a routine that will make an indication such as a log entry that can be used to detect a dual-boot occurrence).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for enabling clean file cache persistence in a system capable of security scanning, comprising:
   storing, responsive to the system being booted-up into a protected environment, ID information for known clean files in a clean file cache, the known clean files resulting from security scanning;
   recording, at a system shutdown from the protected environment, dual-boot indicator information;
   analyzing the dual-boot indicator information, responsive to a boot-up into the protected environment subsequent to the shutdown from the protected environment, to determine whether the system was dual-booted into an unprotected environment in an interim period between the shutdown from the protected environment and the subsequent boot-up into the protected environment; and
   in response to the dual-boot indicator information not indicating any dual-booting, persisting the clean file cache for use in the protected environment.

2. The method of claim 1, further comprising:
   in response to the dual-boot indicator information indicating that the system was dual-booted into an unprotected environment in the interim period, invalidating the clean file cache.

3. The method of claim 1 wherein the dual-boot indicator information includes MFT free sector bitmap data, the method further comprising:
   comparing previously recorded MFT free sector bitmap data with current MFT free sector bitmap data; and
   in response to the MFT free sector bitmap data not substantially matching, determining that the system was dual-booted into an unprotected environment in the interim period.

4. The method of claim 1 wherein the dual-boot indicator information includes one or more NTFS transaction log entries, the method further comprising:
   identifying occurrences of NTFS transaction log entries after time of last shutdown and before time of current startup; and
   in response to those particular NTFS transaction log entries being found, determining that the system was dual-booted into an unprotected environment in the interim period.

5. The method of claim 1 further comprising:
   prompting the user for input indicating the dual-boot indicator information; and
   determining whether the system was dual-booted into an unprotected environment in the interim period responsive to the input from the user.

6. The method of claim 1 wherein the dual-boot indicator information includes one or more of MFT free sector bitmap state data, one or more NTFS transaction log entries, user input regarding dual-boot activity, output from a multi-boot environment detector, and output from a boot sector routine configured to indicate dual-boot activity.

7. A machine-readable medium encoded with instructions, that when executed by one or more processors, cause the processor to carry out a process for enabling clean file cache persistence in a system capable of security scanning, the process comprising:
   storing, responsive to the system being booted-up into a protected environment, ID information for known clean files in a clean file cache, the known clean files resulting from security scanning;
   recording, at a system shutdown from the protected environment, dual-boot indicator information;
   analyzing the dual-boot indicator information, responsive to a boot-up into the protected environment subsequent to the shutdown from the protected environment, to determine whether the system was dual-booted into an unprotected environment in an interim period between the shutdown from the protected environment and the subsequent boot-up into the protected environment; and
   in response to the dual-boot indicator information not indicating any dual-booting, persisting the clean file cache for use in the protected environment.

8. The machine-readable medium of claim 7, the process further comprising:
   scanning files not identified in the clean file cache for undesired code; and
   performing remedial action when malicious code is detected by the scanning.

9. The machine-readable medium of claim 7 wherein the dual-boot indicator information includes MFT free sector bitmap data, the process further comprising:
   comparing previously recorded MFT free sector bitmap data with current MFT free sector bitmap data; and
   in response to the MFT free sector bitmap data not substantially matching, determining that the system was dual-booted into an unprotected environment in the interim period.

10. The machine-readable medium of claim 7 wherein the dual-boot indicator information includes one or more NTFS transaction log entries, the process further comprising:
    identifying occurrences of NTFS transaction log entries after time of last shutdown and before time of current startup; and
    in response to those particular NTFS transaction log entries being found, determining that the system was dual-booted into an unprotected environment in the interim period.

11. The machine-readable medium of claim 7 wherein the dual-boot indicator information includes input from a user, the process further comprising:
    prompting the user for input indicating the dual-boot indicator information; and
    determining whether the system was dual-booted into an unprotected environment in the interim period responsive to the input from the user in response to dual boot.

12. The machine-readable medium of claim 7 wherein the dual-boot indicator information includes one or more of: MFT free sector bitmap data, one or more NTFS transaction log entries, and user input regarding dual-boot activity.

13. The machine-readable medium of claim 7 wherein the dual-boot indicator information includes output from a multi-boot environment detector.

14. The machine-readable medium of claim 7 wherein the dual-boot indicator information includes output from a boot sector routine configured to indicate dual-boot activity.

15. A system for enabling clean file cache persistence in a system capable of security scanning, comprising:

a clean file cache for storing, responsive to the system being booted-up into a protected environment, ID information for known clean files, the known clean files resulting from security scanning; and a dual-boot detector module for recording, at a system shutdown from the protected environment, dual-boot indicator information;

the dual-boot detector module further for analyzing the dual-boot indicator information, responsive to a boot-up into the protected environment subsequent to the shutdown from the protected environment, to determine whether the system was dual-booted into an unprotected environment in an interim period between the shutdown from the protected environment and the subsequent boot-up into the protected environment;

wherein in response to the dual-boot indicator information not indicating any dual-booting, the clean file cache is persisted in the protected environment.

16. The system of claim 15 further comprising:

a signature scanning module for scanning files not identified in the clean file cache for undesired code; and a security module for performing remedial action when malicious code is detected by the scanning.

17. The system of claim 15 wherein the dual-boot indicator information includes MFT free sector bitmap data, and the dual-boot detector module is further configured for comparing previously recorded MFT free sector bitmap data with current MFT free sector bitmap data, and in response to the MFT free sector bitmap data not substantially matching, for determining that the system was dual-booted into an unprotected environment in the interim period.

18. The system of claim 15 wherein the dual-boot indicator information includes one or more NTFS transaction log entries, and the dual-boot detector module is further configured for identifying occurrences of NTFS transaction log entries after time of last shutdown and before time of current startup, and in response to those particular NTFS transaction log entries being found, for determining that the system was dual-booted into an unprotected environment in the interim period.

19. The system of claim 15 wherein the dual-boot detector module is further configured for prompting the user for input indicating the dual-boot indicator information, and for determining whether the system was dual-booted into an unprotected environment in the interim period responsive to the input from the user.

20. The system of claim 15 wherein the dual-boot indicator information includes one or more of: MFT free sector bitmap data, one or more NTFS transaction log entries, user input regarding dual-boot activity, output from a multi-boot environment detector, and output from a boot sector routine configured to indicate dual-boot activity.

* * * * *

UNITED STATES PATENT AND TRADEMARK OFFICE
CERTIFICATE OF CORRECTION

PATENT NO.        : 7,739,738 B1                                        Page 1 of 1
APPLICATION NO.   : 11/376770
DATED             : June 15, 2010
INVENTOR(S)       : William E. Sobel and Bruce E. McCorkendale It is certified that error appears in the above-identified patent and that said Letters Patent is hereby corrected as shown below:

Column 14, line 55, Claim 11, after "user" please delete "in response to dual boot".

Signed and Sealed this

Ninth Day of November, 2010

David J. Kappos
*Director of the United States Patent and Trademark Office*